United States Patent [19]

Sager

[11] 3,968,368

[45] July 6, 1976

[54] INSPECTION APPARATUS AND METHOD FOR HOT GLASS CONTAINERS

[75] Inventor: James R. Sager, Sylvania, Ohio

[73] Assignee: Owens-Illinois, Inc., Toledo, Ohio

[22] Filed: Mar. 10, 1975

[21] Appl. No.: 556,774

[52] U.S. Cl. ............................... 250/340; 250/349; 250/359
[51] Int. Cl.² .......................................... G01J 1/00
[58] Field of Search ........... 250/338, 340, 349, 358, 250/359, 360, 223 B; 209/111.5

[56] References Cited
UNITED STATES PATENTS

| | | | |
|---|---|---|---|
| 3,356,212 | 12/1967 | Landin | 250/223 B X |
| 3,529,169 | 9/1970 | Heaney et al. | 250/223 B |
| 3,549,890 | 12/1970 | Keller | 250/223 B X |
| 3,827,812 | 8/1974 | Heimann | 250/223 B X |

*Primary Examiner*—Davis L. Willis
*Attorney, Agent, or Firm*—Steve M. McLary; Edward J. Holler

[57] ABSTRACT

Apparatus and method for inspecting hot glass containers by sensing the heat radiation from the bottles. Newly formed glass containers are moved past the apparatus of this invention in a single file immediately after leaving the bottle forming machines. A series of four heat-sensing probes register the heat radiation pattern of containers as they pass by. A logic unit determines if the container is of the proper diameter, standing upright, and has a neck portion that is not significantly inclined from the vertical. Containers which are lying down, two containers stuck together, or containers which have a bent neck portion are rejected.

8 Claims, 12 Drawing Figures

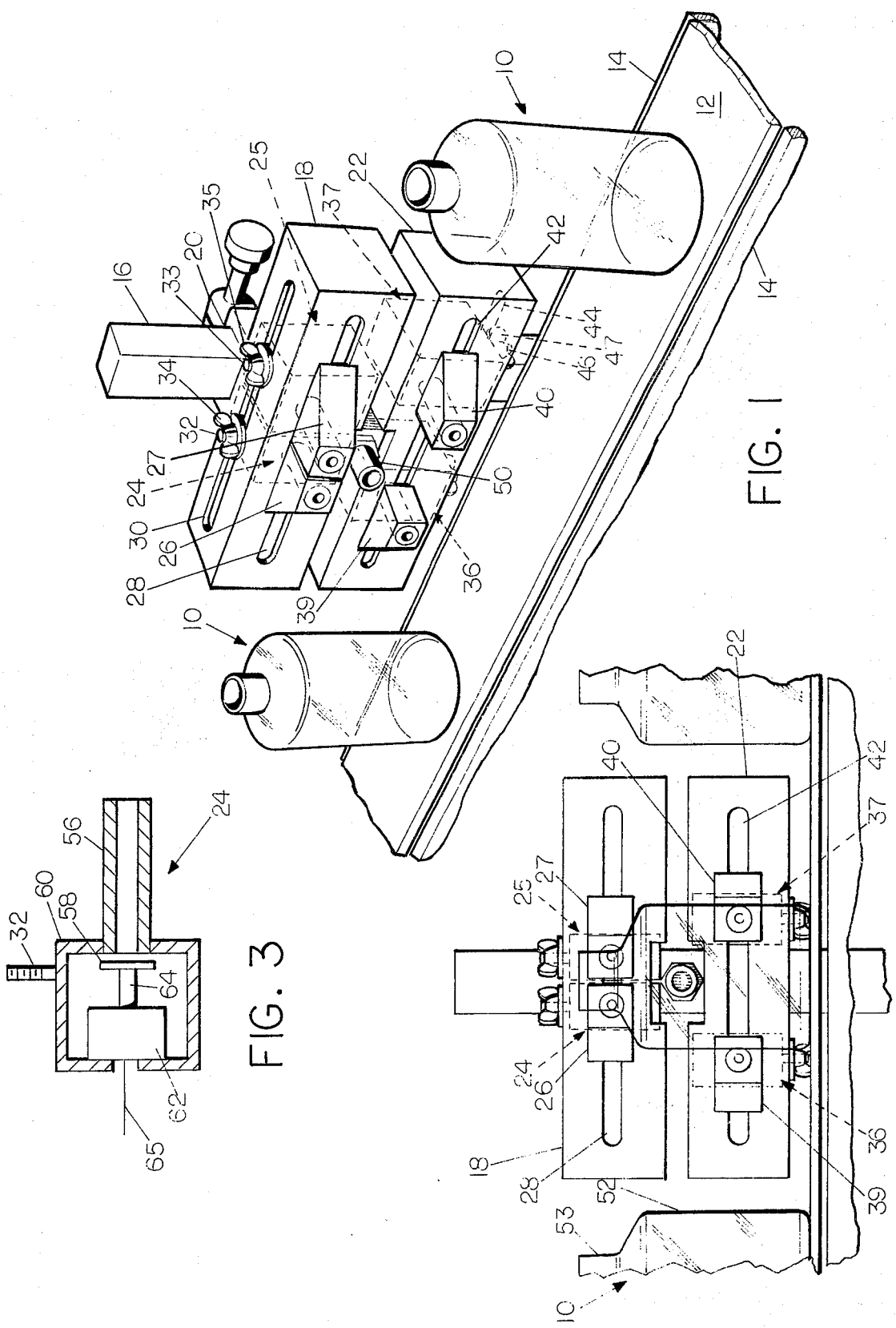

INSPECTION APPARATUS AND METHOD FOR HOT GLASS CONTAINERS

BACKGROUND OF THE INVENTION

This invention generally relates to an apparatus and method for the inspection of newly formed, hot glass containers. More particularly, this invention relates to such an apparatus wherein the heat radiation of the newly formed glass containers is sensed for inspection purposes. Specifically, this invention relates to such an inspection device which will allow removal of malformed or misoriented glass containers from a single file stream of glass containers.

After formation in a bottle making machine, such as the well-known IS machine, glass containers are transported in single file on a conveyor to an annealing lehr. In order to be properly loaded into the lehr, the containers must be standing upright on their bases. In many cases, the glass containers pass through a tunnel in which a metal oxide coating is applied to their outer surfaces. This tunnel is positioned intermediate the forming machine and the lehr. Glass containers which are lying down on the conveyor or two glass containers which are stuck together can jam in the tunnel, as well as cause difficulty during the transfer into the lehr. Glass containers with badly bent necks, so-called "leaners", are so obviously defective that they should be removed from the stream of containers as soon as possible.

The area adjacent the glass container forming machine presents a very hostile environment for inspection equipment. Despite the need for a device to detect and reject glass containers oriented or distorted as described above, to date I am not aware of any device which will serve this function reliably and inexpensively. In my invention, relatively rugged and simple lead sulfide cells sense heat radiation from glass containers shortly after they leave the forming machine. A logic unit, which may be fully protected from the hostile environment, then processes the electrical signals resulting from sensing of the heat radiation and determines whether to accept or reject every glass container that passes the sensing cells.

Some examples of prior art devices may be seen in the following U.S. Patent Nos. 3,248,845; 3,365,699; 3,506,840; 3,549,890; 3,529,169; 3,620,629; 3,621,266; 3,716,136; 3,731,205; and 3,754,123.

SUMMARY OF THE INVENTION

My invention is in an apparatus and method for inspecting hot glass containers which have an upper portion and a lower portion. The glass containers are moved in a single file past the apparatus. A first pair of heat-radiation sensing means are located adjacent the path of travel of the glass containers. The first heat sensing means are positioned so that both of them can be in a simultaneous line of sight with the upper portion. Each of the first pair of heat sensing means generates an individual signal in response to heat radiation from the glass containers. A second pair of heat-radiation sensing means are also located adjacent the path of travel of the glass containers. This pair of heat sensing means are positioned with the downstream one of the pair in a line of sight with the lower portion of the glass container when the first pair of heat sensing means are in a line of sight with the upper portion. At this time, the upstream one of the second pair of heat sensing means is positioned to be out of the line of sight of the lower portion. The second pair of heat sensing means will generate individual signals in response to any heat radiation they see. A means is provided for holding the first and second pair of heat-radiation sensing means in a fixed location. A logic means, responsive to signals from the first and second heat-radiation sensing means, will generate a signal if the signals from the first and second heat-radiation sensing means do not occur in a pre-selected pattern.

BRIEF DESCRIPTION OF THE DRAWINGS

FIG. 1 is a perspective view of the apparatus of the present invention;

FIG. 2 is a side, elevational view, on a reduced scale, of a portion of the invention shown in FIG. 1;

FIG. 3 is a side, elevational view, in cross-section and on an enlarged scale, of a heat-radiation sensing probe of the present invention;

DETAILED DESCRIPTION OF THE DRAWINGS

Figure 4:
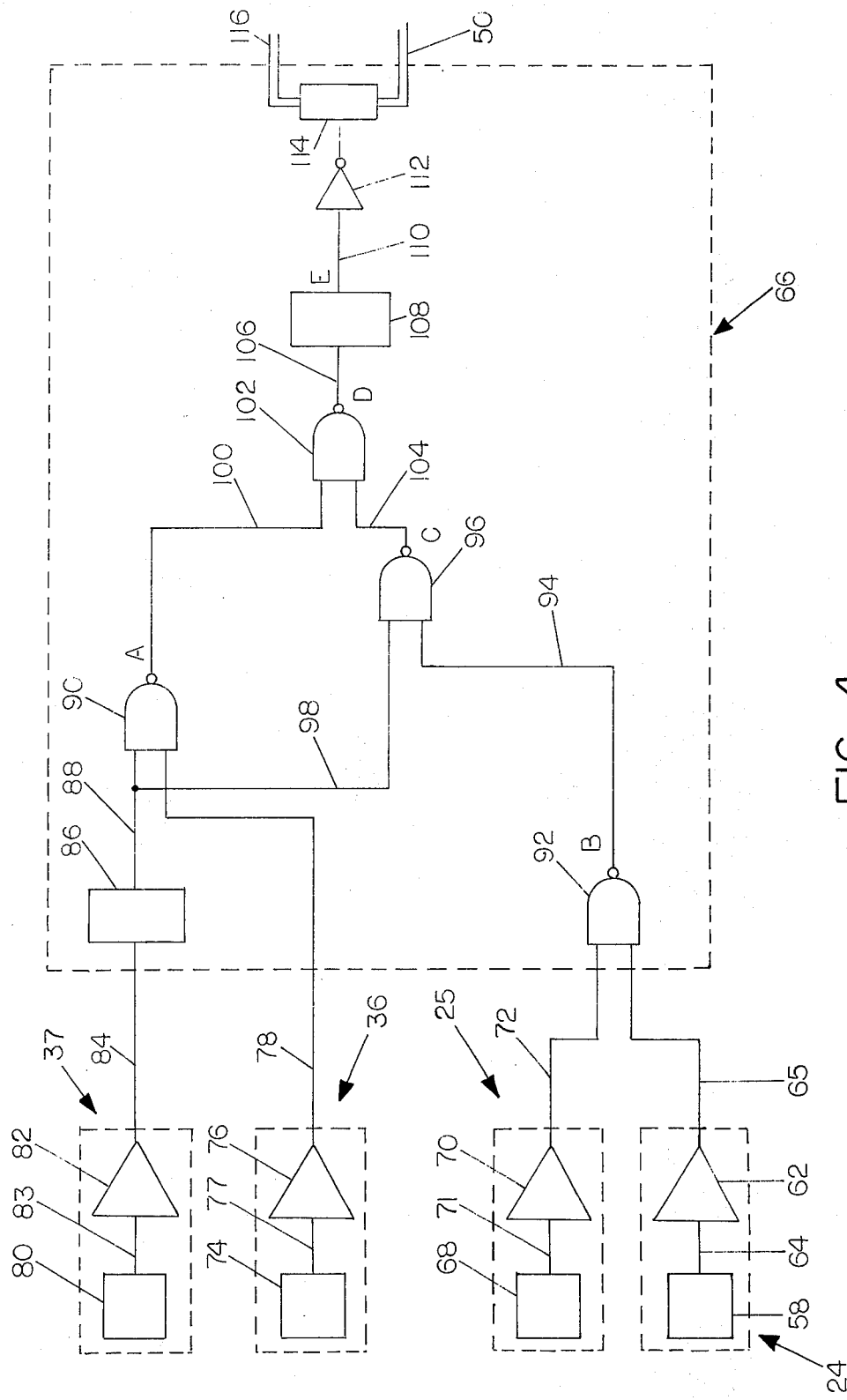
FIG. 4 is a block diagram of the signal processing logic of the present invention.

FIG. 1 illustrates the apparatus of the present invention in its general operational environment. A plurality of glass containers 10 are transported from a glass forming machine on an endless moving conveyor belt 12 which is supported by side frames 14. The glass containers 10 are at an elevated temperature, on the order of 1,000° F., and therefore radiate appreciable heat. At this stage in the formation of glass containers, the glass containers 10 are transported into an annealing lehr for removal of residual stresses and cooling to room temperatures. It is important that all of the glass containers 10 which proceed from the forming machine toward the annealing lehr are in an upright orientation and have no serious defects present. Otherwise, such containers might jam in the handling equipment that is present further downstream. Therefore, the present invention is designed to separate those glass containers 10 which exhibit major defects from the stream of glass containers 10 passing on the conveyor 12. The apparatus of the present invention is supported from a main vertical support column 16 which is attached to one of the side frames 14. An upper probe carrier 18 is attached to the vertical support columns 16 through a clamp member 20. A lower probe carrier 22 is likewise attached to the vertical support columns 16 by a clamp member which is not visible in FIG. 1. The clamp members such as member 20 allow the probe carriers 18 and 22 to be moved vertically on the vertical support columns 16 and then locked into a desired location. The upper probe carrier 18 carries two heat-radiation sensing probes 24 and 25. The probes 24 and 25 have their outer exposed portions protected by shield members 26 and 27. The shield members 26 and 27 are mounted within the upper probe carrier 18 in an elongated slot 28. The shield members 26 and 27 may slide in the slot 28 thus allowing the longitudinal separation of the sensing probes 24 and 25 to be varied. It is quite evident that the entire sensing probe assemblies 24 and 25 will move as a unit with the shield members 26 and 27. In addition, the upper probe carrier 18 also has an upper elongated slot 30 in which threaded bolts 32 and 33 respectively connected to the sensing probes 24 and 25 are free to slide as the shield members 26 and 27 are moved in the slot 28. When the desired longitudinal separation of the sensing probe units 24 and 25 has been achieved, wing nuts 34 and 35 may be tightened to hold the sensing probe units 24 and 25 in these locations. The lower probe carrier 22 is basically identical to the upper probe carrier 18. Two lower heat-radiation sensing probes 36 and 37 are carried by the lower probe carrier 22. The lower sensing probes 36 and 37 have their exposed portions protected by shield members 39 and 40. The shield members 39 and 40 are free to slide in a longitudinal slot 42 formed in the lower probe carrier 22, the slot 42 being basically identical to the slot 28. This again allows adjustment of the longitudinal separation of the heat-sensing probes 36 and 37. The lower probe carrier 22 has a second elongated longitudinal slot 44 formed in its lower surface. The slot 44 serves the purpose in the carrier 22 as did the slot 30 in the upper carrier 18. Namely, the lower heat-radiation sensing probes 36 and 37 have extending from their lower surfaces threaded bolts which extend into and out of the slot 44 and wing nuts are attached to these bolts to allow securing the lower sensing probes 36 and 37 in a desired longitudinally separated position. Only the threaded bolt 46 and wing nut 47 for the sensing probe 37 are visible in FIG. 1. Mounted between the upper probe carrier 18 and the lower probe carrier 22 is a rejection means 50 for removing defective glass containers 10 from the conveyor 12. In this case, the rejection means takes the form of a tube which allows a jet of high pressure air to blow a defective glass container 10 from the conveyor 12. Note that while the tube 50 is shown between the upper and lower carriers 18 and 22, it could be positioned downstream of their location or could be positioned above or below them, depending upon the size and shape of the glass containers 10 being inspected, and upon the space requirements imposed upon the position at which this inspection device is mounted.

FIG. 2 is included to illustrate the configuration assumed by the sensing probes 24, 25, 36 and 37 in the inspection of glass containers 10 to determine if the glass container 10 is defective or not. The glass containers 10, by way of a specific example, may be of the general type which have a body portion 52 and a neck portion 53. This invention may also be used with glass containers of the wide-mouth type, such as peanut butter jars, which do not have a defined neck portion. In the most general case, the upper probes 24 and 25 view or "see" an upper portion of the glass container 10 while the lower probes 36 and 37 "see" a lower portion of the glass container 10. As was previously noted, the glass containers 10 at this stage in their manufacturing process are still at an elevated temperature and are radiating appreciable quantities of heat. It may be seen in FIG. 2 that a good glass container 10 will cover both the upper heat-sensing probes 24 and 25 and the lower heat-sensing probe 37 simultaneously. The other lower heat-sensing probe 36 will not be covered. Note that the term covered is used only in the most general sense; the probes are not actually touched by the glass container 10, but rather the probes are in a line of sight to the heated area that is represented by the neck portion 53 and the body portion 52 of the glass containers 10. The probes will then generate an output electrical signal which indicates the presence of a heated area before them. Thus a good glass container 10 will cause simultaneous generation of signals from the upper heat-sensing probes 24 and 25 and the lower heat-sensing probe 37 and no signal generation from the lower heat-sensing probe 36. Observe that as the diameter and height of the glass container 10 changes, the entire apparatus may be adjusted to compensate for these changes as was discussed with reference to FIG. 1.

All of the heat-sensing probes 24, 25, 36 and 37 are identical in construction. FIG. 3 shows a typical one of the probes, selected as heat-sensing probe 24, in a somewhat schematic cross-sectional view. An elongated tube 56 extends beyond the face of the upper probe carrier 18 and is generally surrounded by the shield member 26. The shield member 26, as are all the shield members, is designed primarily to prevent mechanical damage to the tube 56 as a result of glass containers which are out of alignment striking the tubes. The tube 56 has a central bore which is aligned to allow heat radiation from a glass container 10 to enter it. At the end of the bore in the tube 56 is positioned a heat-sensitive means 58 which may be a lead sulfide cell. Lead sulfide cells are responsive to heat radiation and generate an electrical signal in response to this heat radiation. Note that this is a relatively simple sensing or probe arrangement in that no optical devices are required, nor are any sensitive or delicate temperature-sensing elements required. The lead sulfide cell 58 is a rugged and dependable sensor and is capable of withstanding the severe operational environment in which it is placed. The tube 56 is actually connected into a protective housing 60 in which is mounted the lead sulfide cell 58 and an amplifier 62 connected to the lead sulfide cell 58. The purpose of the housing 60 is to provide some degree of protection, both thermal and mechanical, for the amplifier 62 and for the lead sulfide cell 58. The output from the cell 58 is connected to the amplifier by a conductor pair 64. The output from the amplifier 62 is along an electrical conductor 65 which is connected to a logic unit 66 which may be mounted adjacent to the conveyor 12. Note that all of the heat-radiation sensing probes are of this configuration and all will provide a separate output signal to the logic unit 66.

FIG. 4 illustrates the electronic logic of the present invention in a block diagram form. The heat-radiation sensing probe 25, as was the case with the probe 24, contains a heat-sensing cell 68 which is connected to an amplifier 70 by a conductor 71. The output of the amplifier 70 is carried along a conductor 72 to the logic unit 66. The heat-radiation sensing probe 36 contains a heat-sensing cell, such as a lead sulfide cell, 74 which is connected to an amplifier 76 by a conductor 77. An electrical conductor 78 connects the output of the amplifier 76 to the logic unit 66. The heat-radiation sensing probe 37 likewise has a heat-sensing cell 80 connected to an amplifier 82 by a conductor 83. An electrical conductor 84 carries the output of the amplifier 82 to the logic unit 66. In discussing the signal processing procedures followed in the logic unit 66, it should be realized that the choice of NAND gates as the basic logic units was simply based upon practical engineering considerations. NOR gate logic could be used equally well, as could other logic configurations. The output conductor 84 from the amplifier 82 is connected to an input of a one-shot unit 86. The one-shot unit 86 will produce a pulse of approximately one millisecond duration whenever it receives a signal along the conductor 84. The pulse from the one-shot 86 is carried by a conductor 88 to an input terminal of a first NAND gate 90. Connected to a second input terminal of the first NAND gate 90 is the conductor 78 which carries the output signal from the amplifier 76. The two output conductors 72 and 65 from the amplifiers 70 and 62 respectively are connected to inputs of a second NAND gate 92. The output of the second NAND gate 92 is connected through an electrical conductor 94 to one input of a third NAND gate 96. A second input to the third NAND gate 96 is from a branch conductor 98 connected to the conductor 88 carrying the output pulse from the one-shot unit 86. The output of the first NAND gate 90 is carried along a conductor 100 to one input of a fourth NAND gate 102. The output of the third NAND gate 96 is carried by an electrical conductor 104 to a second input of the fourth NAND gate 102. The fourth NAND gate 102 has its output carried by a conductor 106 to a second one-shot unit 108. Whenever the second one-shot unit 108 receives a signal along the conductor 106, the decision has been made that a defective glass container 10 is present and should be rejected. The one-shot unit 108 will generate an output pulse that will be carried along an output conductor 110 which can operate the rejection means 50. It may be necessary that the output pulse be amplified or inverted by use of an amplifying unit 112 which may also act to invert the signal generated by the one-shot unit 108. This may then serve to operate a solenoid-type air valve 114 which is connected to a source of compressed air, that is not shown, by a pipe line 116. In the specific example given, the rejection means 50 includes a tube which is connected to an output of the solenoid valve 114. Whenever the solenoid valve 114 receives a signal from the amplifying means 112, it will open and allow a blast of compressed air to move along the tube 50 and thus knock any glass container 10 in its path off of the moving conveyor belt 12. The operation of this system is best understood by a series of examples of various types of defects which can occur in the glass containers 10. These will be given in a following sequence of waveforms illustrating the progress of a signal through the entire processing system. For ease of identification of the location of various signals within the system, the output of the first NAND gate 90 has been labelled as A, the output of the second NAND gate 92 as B, the output of the third NAND gate 96 as C, the output of the fourth NAND gate 102 as D, and the output of the one-shot 108 as E.

Figure 5:
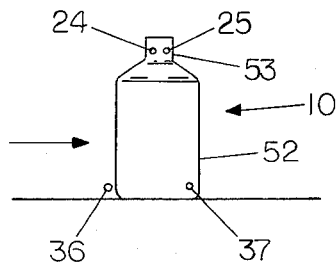
FIG. 5 is a schematic representation of a good glass container as it passes the sensing probes of the present invention.
Figure 6:
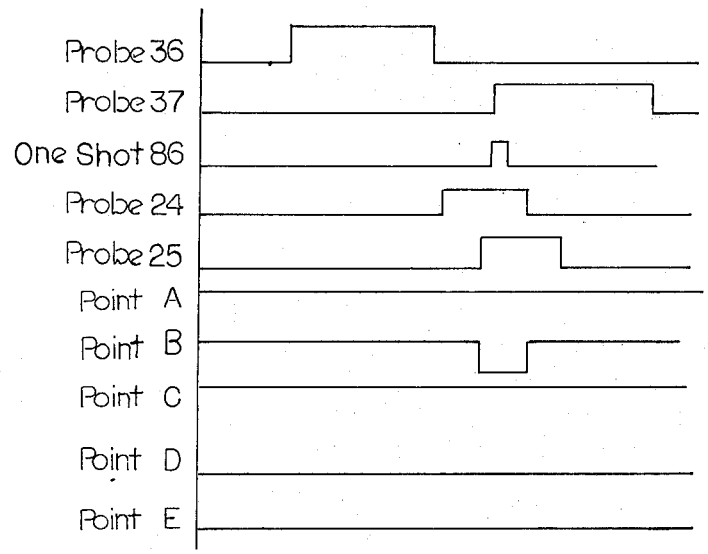
FIG. 6 is a chart showing the signals generated by a glass container of the configuration of FIG. 5.

FIGS. 5 and 6 illustrate the situation which prevails when a good glass container 10 is presented. The probes 24 and 25 are simultaneously blocked by the neck portion 53 while the probe 37 is blocked by the body portion 52. The probe 36 is completely clear of the glass container at this time. It is important again to realize that the term blocked will be used henceforth to describe the line of sight of the various probes. The term blocked is not completely accurate since what occurs is that the probes have presented to their line of sight an intense heat-radiation area that is the hot glass container 10. However, it is easier to visualize the situation by saying that the probes are blocked by various portions of the glass container than to use the precise terminology required to explain the actual circumstances. FIG. 6 illustrates the waveforms which are then generated in response to the configuration of the glass container and probes seen in FIG. 5. First of all, the probe 36 will cause generation of a signal whose duration is equal to the width of the glass container 10. After the glass container 10 has passed the probe 36, it will pass the probe 37 causing generation of a similar signal. Note that as the probe 37 begins to generate its signal, the one-shot 86 will generate a relatively sharp pulse of about one millisecond duration. The probe 24 will see the hot glass container before the probe 25, as illustrated by the waveforms for the probes 24 and 25 in FIG. 6. There will occur a time when both the probes 24 and 25 will simultaneously be generating a signal and when the signal from the one-shot unit 86 will also be on. At the time when the signal from the one-shot 86 occurs, this signal is fed to the NAND gate 90 along with the signal from the probe 36. Since one of the signals to the NAND gate 90 is high and the other is low, the output point A will be high. In a similar manner, the output of the NAND gate 92, point B, will be low only during the time when both the probes 24 and 25 are on. The NAND gate 96 whose output is designated as C will maintain a consistently high output since at no time during this particular test cycle do both input signals to the NAND gate 96 go high simultaneously. Signals A and C are fed to the NAND gate 102 but since both signals are high, point D remains low and consequently point E will also remain low since no input signal is fed to the one-shot 108.

Figure 7:
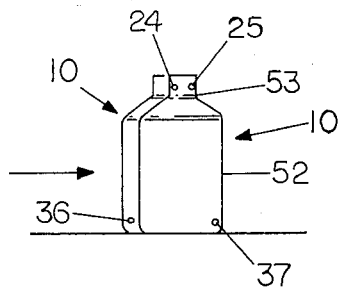
FIG. 7 is a schematic representation of two glass containers which are stuck together as they pass the sensing probes of the present invention.
Figure 8:
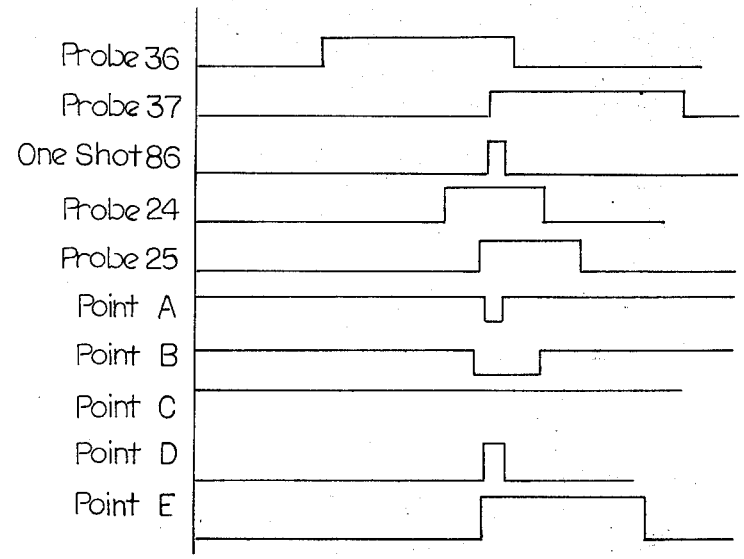
FIG. 8 is a chart showing the signals generated by stuck glass containers as shown in FIG. 7.

FIGS. 7 and 8 illustrate the situation of two glass containers 10 which are stuck together. In this case, note that not only are the probes 24 and 25 simultaneously blocked, but the probes 36 and 37 are also blocked at the same time. The waveform generated by the probe 36 is relatively longer that the waveform shown in FIG. 6 because of the accentuated length presented by two glass containers which are stuck together. Thus, at the time the probe 37 is generating a high signal indicating the presence of the glass container before it, the probe 36 is also generating a signal indicating the presence of the glass container before it. The pulse generated by the one-shot 86 when entered into the NAND gate 90 with the high pulse from the probe 36 results in the output of the NAND gate 90, point A, going low for the period of time when these two signals are simultaneously high. As was the case with FIG. 6, the probes 24 and 25 have an overlapping period when both are high. This is represented by point B which shows that the output of the NAND gate 92 goes low when both of these signals are high. The signal from point B and the output of the one-shot 86 are fed to the NAND gate 96 which is the waveform that is designated as point C. The NAND gate 102 has as inputs the signals from point A and point C. The NAND gate 102 will generate an output pulse or a high pulse whenever either of its inputs go to a low value. Note that in this case point A does go low for a period of time and occurs during the overlap of signals resulting from the probes 36 and 37 being on simultaneously. This then results in generation of a high pulse at point D and consequent generation of an output pulse at point E from the one-shot 108. This then triggers the solenoid valve 114 and causes rejection of the two glass containers which are stuck together. It should therefore be clear that if the signals from the first pair of heat-sensing probes 24 and 25 and from the second pair of heat-sensing probes 36 and 37 do not occur in a preselected pattern, as shown in FIGS. 5 and 6, that a rejection signal will be generated.

Figure 9:
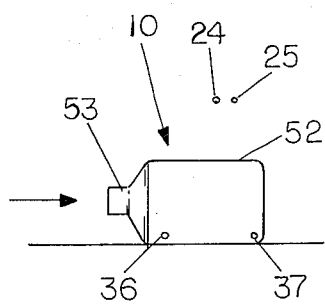
FIG. 9 is a schematic representation of a down glass container as it passes the sensing probes of the present invention.
Figure 10:
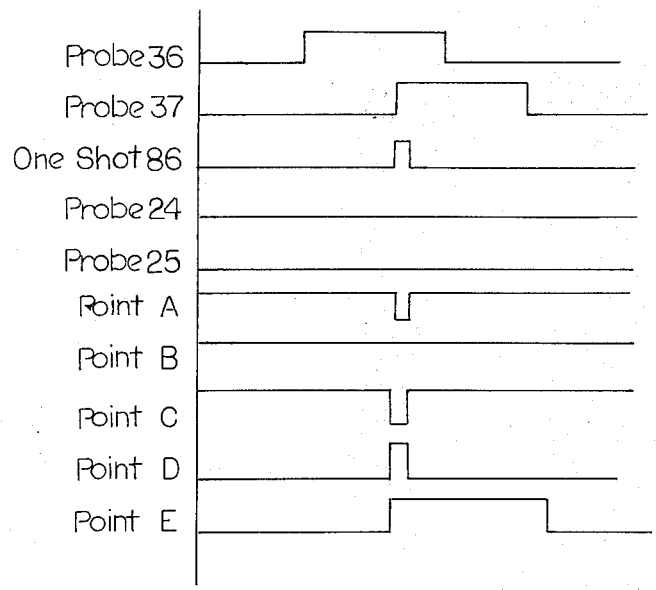
FIG. 10 is a chart showing the signals generated by the down glass container as shown in FIG. 9.

FIGS. 9 and 10 illustrate the situation of a glass container 10 which is lying down and not proceeding upright on its base as would normally be the case. The most striking point of this situation is that probes 24 and 25 are never blocked or see the neck portion 53 of the glass container as occurs in the other situations. Thus, as was the case in FIGS. 7 and 8 there is a period of time when both probes 36 and 37 simultaneously can see the hot glass container. FIG. 10 illustrates the waveforms which are generated as a result of the configuration shown in FIG. 9. The one-shot 86 generates its pulse in response to the beginning of the signal from the probe 37. At this time note that the probe 36 is also still generating an output signal. The probes 24 and 25 should normally generate a high output signal at this time but do not do so because of the glass container 10 lying on its side. The output signal to the NAND gate 92 is thus two low signals which means that the output of point B will remain high. However, the output of the NAND gate 90, point A, will go low at the point at which the pulse from the one-shot 86 coincides with the introduction of the signal from the probe 36, both signals being high simultaneously. Therefore, the output A will have a low pulse. This low pulse A, with the input to the NAND gate being two high signals, will cause the output designated as point C to have one period of time when the signal will go low, namely so long as the output from the one-shot 86 is on. In this situation then, the NAND gate 102 will receive a simultaneous low signal from points A and C which will therefore make the output of the NAND gate 102 at point D go high. When this occurs, the one-shot 108 will be triggered and an output pulse at point E will be generated, therefore actuating the solenoid valve 114 and rejecting a downed container.

Figure 11:
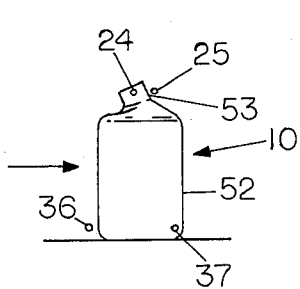
FIG. 11 is a schematic representation of a glass container with a badly bent neck portion as it passes the sensing probes of the present invention.
Figure 12:
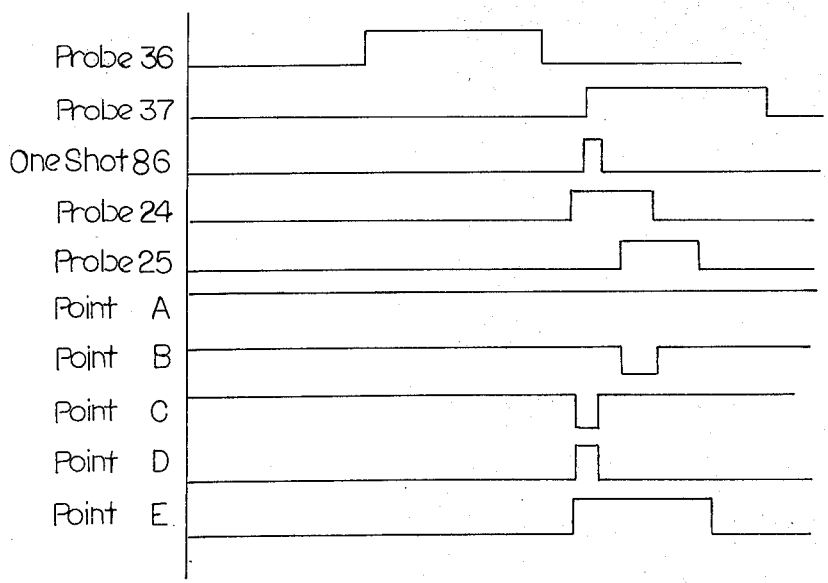
FIG. 12 is a chart showing the signals generated by the glass container with a bent neck portion as shown in FIG. 11.

FIGS. 11 and 12 illustrate yet another situation of glass container configuration which is detectable by the apparatus of the present invention. In FIG. 11, it may be seen that the glass container 10 has a badly bent neck portion 53. This is also an undesirable condition and glass containers of this type should be removed. Note that in this situation, only the top sensor 24 will see the glass container neck 53 at the same time as the lower sensor 37 sees the body portion 52 of the glass container. FIG. 12 illustrates the waveforms that are generated in response to this configuration. The probe 36 again sees the body portion 52 of the glass container before the probe 37. Thus, as was the case in FIGS. 5 and 6, the signal from the probe 36 has ended before the signals from the probe 37 begins. This then shows that the glass container 10 is in an upright position and is not of an excessive width, as would be indicated by two glass containers stuck together. Again, the pulse is generated by the one-shot 86 in response to the beginning of the signal from the probe 37. At the same time, the signal from the probe 24 is beginning, although the precise overlap between the signals from the probe 37 and 24 is not critical. Sometime after the signal from the probe 24 has begun, signal from the probe 25 will also begin. However, note the distinction which occurs in this particular configuration of waveforms as versus that seen in FIG. 6 for a good container. The waveforms from the one-shot 86, the probe 24 and the probe 25 have a period of time in which they overlap or in which all three are high for a good container 10. In the case shown in FIG. 12, it is quite evident that the pulse from the one-shot 86 has terminated or gone back to a low level before the signal from the probe 25 rises to its high level. The situation which therefore occurs is this: the output of the NAND gate 90 at point A will remain high at all times since it has presented to it a low signal from the probe 36 and at one time a high signal from the one-shot unit 86. The output of the NAND gate 92 at point B will go low at one time when both the probes 24 and 25 are generating a high signal. This is then fed to the NAND gate 96. However, note that for the NAND gate 96 to present a consistently high output, the signals from point B and from the one-shot unit 86 must coincide in time. It is quite clear that this does not occur and that at one time the high signal from the one-shot 86 is presented with a high signal from the NAND gate 92, point B, to the NAND gate 96 thus resulting in the output of the NAND gate 96 dropping to a low level at point C. When this occurs, the signal from point C is low and the signal from point A is high, both signals being fed to the NAND gate 102. When this combination of signals is presented to the NAND gate 102, an output signal is generated at point D which in turn triggers the one-shot unit 108 to generate an output signal at point E which again activates the solenoid valve 114 to remove a glass container 10 with a bent neck from the conveyor 12.

What I claim is:

1. Apparatus for the inspection of hot glass containers having an upper portion and a lower portion, wherein said glass containers are moved in single file past said apparatus, said apparatus comprising, in combination:

a first pair of heat-radiation sensing means, located adjacent to the path of travel of said glass containers and positioned so that both can be in a simultaneous line of sight with the upper portion of said glass containers, for generating individual signals in response to heat-radiation from said glass containers said first pair of heat-radiation sensing means each including;

a housing;

an elongated tube, pointed in the direction of said glass containers, connected to and in communication with the interior of said housing;

a heat-radiation responsive lead sulfide cell mounted in the interior of said housing in a line of sight with the bore of said tube; and electronic amplification means, connected to said lead sulfide cell, for amplifying the output signal of said lead sulfide cell;

a second pair of heat-radiation sensing means; located adjacent to the path of travel of said glass containers and positioned to have the downstream one of said second pair of heat-radiation sensing means in a line of sight with the lower portion of said glass containers while both of said first pair of heat-radiation sensing means are in a line of sight with said upper portion while the upstream one of said second pair of heat-radiation sensing means is out of the line of sight of said lower portion, for generating individual signals in response to heat radiation from said glass containers said second pair of heat-radiation sensing means each including;

a housing;

an elongated tube, pointed in the direction of said glass containers, connected to and in communication with the interior of said housing;

a heat-radiation responsive lead sulfide cell mounted in the interior of said housing in a line of sight with the bore of said tube; and electronic amplification means, connected to said lead sulfide cell, for amplifying the output signal of said lead sulfide cell;

means for holding said first and second pairs of heat-radiation sensing means in a fixed location, said means for holding including;

a vertical support column positioned adjacent to the path of travel of said hot glass containers;

an upper probe carrier, slideably mounted on said support column, having a longitudinally extending slot formed therein extending along the path of travel of said glass containers, said first pair of heat-radiation sensing means tubes extending through said upper probe carrier slot; and a lower probe carrier, slideably mounted on said support column, having a longitudinally extending slot formed therein extending along the path of travel of said glass containers, said second pair of heat-radiation sensing means tubes extending through said lower probe carrier slot; and logic means, responsive to signals from said first and second heat-radiation sensing means, for generating an output signal if the signals from said first pair and second pair of heat-radiation sensing means do not occur in a pre-selected time related pattern.

2. The apparatus of claim 1 which further includes: rejection means, operative in response to a signal from said logic means, for removing from the single file of glass containers any glass container which causes generation of a signal by said logic means.

3. The apparatus of claim 1 which further includes: a shield member covering substantially the entire length of said elongated tube to protect said elongated tube from accidental contact with said glass containers.

4. The apparatus of claim 1 which further includes: a shield member covering substantially the entire length of said elongated tube to protect said elongated tube from accidental contact with said glass containers.

5. The apparatus of claim 1 wherein said logic means includes:

a one-shot unit having an input terminal connected to said downstream one of said second pair of heat sensing means and responsive to a signal therefrom to generate a pulse on an output terminal of said one-shot unit;

a first NAND gate, having an output terminal and one input terminal connected to the output terminal of said one-shot unit and a second input terminal connected to said upstream one of said second pair of heat sensing means;

a second NAND gate, having an output terminal and two input terminals, said input terminals being respectively connected to said first pair of heat sensing means;

a third NAND gate, having an output terminal and a first input terminal connected to the output terminal of said one-shot unit and a second input terminal connected to the output terminal of said second NAND gate; and a fourth NAND gate, having an output terminal and a first input terminal connected to the output terminal of said first NAND gate and a second input terminal connected to the output terminal of said third NAND gate, the occurrence of a signal at the output terminal of said fourth NAND gate signaling the failure of the pre-selected pattern of signals from said heat sensing means.

6. The apparatus of claim 5 which further includes: rejection means, operative in response to a signal from said fourth NAND gate, for removing a glass container causing generation of such a signal from the single file of glass containers.

7. A method for inspecting hot glass containers, having an upper portion and a lower portion, which comprises the steps of:

a. passing said glass containers in single file past an inspection station;

b. simultaneously sensing the heat radiation from said upper portion at two points on said upper portion;

c. generating two separate electrical signals representing the sensed heat radiation from said upper portion;

d. simultaneously with step (b), sensing the heat radiation from the lower portion of said glass container at a single location;

e. generating an electrical signal representing the sensed heat radiation from said lower portion;

f. simultaneously with steps (b) and (d), sensing the heat radiation present at a location upstream of the glass container flow at a distance greater than one diameter of the lower portion of said glass container removed from the location where the heat radiation from said lower portion is sensed in step (d);

g. generating an electrical signal representing the heat radiation sensed in step (f);

h. electronically comparing the signals generated in steps (c), (e) and (g) with a pre-selected pattern of occurrence of said signals; and i. generating an electrical signal in response to deviation from said pre-selected pattern of occurrence.

8. The method of claim 7 which includes the further step of:

rejecting a glass container from the single file of glass containers in response to the electrical signal generated in step (i).

* * * * *